US012183155B1

(12) United States Patent
Grujicic

(10) Patent No.: US 12,183,155 B1
(45) **Date of Patent: *Dec. 31, 2024**

(54) SYSTEMS AND METHODS TO REDUCE PROBLEM GAMING

(71) Applicant: Mywagerscore.com LLC, New York, NY (US)

(72) Inventor: Bo Grujicic, New York, NY (US)

(73) Assignee: Mywagerscore.com LLC, New York, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/947,934

(22) Filed: Sep. 19, 2022

Related U.S. Application Data

(63) Continuation of application No. 17/081,782, filed on Oct. 27, 2020, now Pat. No. 11,450,176, which is a continuation of application No. 16/434,141, filed on Jun. 6, 2019, now Pat. No. 10,825,293.

(60) Provisional application No. 62/681,812, filed on Jun. 7, 2018.

(51) Int. Cl.
*G07F 17/32* (2006.01)

(52) U.S. Cl.
CPC ...... *G07F 17/3244* (2013.01); *G07F 17/3239* (2013.01)

(58) Field of Classification Search
CPC .......................... G07F 17/3244; G07F 17/3239
See application file for complete search history.

(56) References Cited

U.S. PATENT DOCUMENTS

| | | | | |
|---|---|---|---|---|
| 10,217,162 | B2 | 2/2019 | Sion et al. | |
| 10,357,713 | B1 | 7/2019 | Landers et al. | |
| 10,592,837 | B2 | 3/2020 | Sinha et al. | |
| 10,592,930 | B2 | 3/2020 | Ramer et al. | |
| 2003/0236728 | A1* | 12/2003 | Sunderji | G06Q 40/02 705/35 |
| 2007/0010322 | A1* | 1/2007 | Walker | G07F 17/3239 463/25 |
| 2013/0035167 | A1 | 2/2013 | Angelakis et al. | |
| 2013/0054314 | A1 | 2/2013 | Ross et al. | |
| 2014/0074688 | A1 | 3/2014 | Shvarts et al. | |
| 2014/0365354 | A1* | 12/2014 | Shvarts | G06Q 40/02 705/38 |
| 2018/0256095 | A1 | 9/2018 | Arnold et al. | |

* cited by examiner

*Primary Examiner* — Ronald Laneau
(74) *Attorney, Agent, or Firm* — Lee Sullivan Shea & Smith LLP

(57) ABSTRACT

An example computing device obtains financial data corresponding to a user and based on the financial data, determines an initial risk score for the user that represents an estimate of financial risk of the user. The computing device receives, from a computing system associated with a gaming platform, wagering activity data corresponding to wagers placed by the user. Based on the wagering activity data, the computing device determines an updated risk score for the user that indicates an increased estimate of financial risk. Based on determining the updated risk score, the computing device transmits (i) a first message that causes a user device to display (a) a notification that wagering activity has been suspended and (b) a request for user-input data and (ii) a second message that causes the computing system associated with the gaming platform to suspend user wagering activity via the gaming platform.

20 Claims, 6 Drawing Sheets

SYSTEMS AND METHODS TO REDUCE PROBLEM GAMING

CROSS REFERENCE TO RELATED APPLICATIONS

This application claims priority under 35 U.S.C. § 120 to, and is a continuation of, U.S. patent application Ser. No. 17/081,782, filed on Oct. 27, 2020, entitled "Systems and Methods to Reduce Problem Gaming," which is a continuation of U.S. patent application Ser. No. 16/434,141, filed on Jun. 6, 2019, entitled "Creating and Delivering Customized Gaming Rebates to Reduce Problem Gaming," which claims the benefit of priority under 35 USC § 119 (e) to U.S. Provisional Application Ser. No. 62/681,812 filed on Jun. 7, 2018 and entitled "Creating and Delivering Customized Gaming Rebates for Wagers on Sporting Events," the contents of each of which are incorporated by reference herein in their entireties.

FIELD OF THE DISCLOSURE

The disclosure is related to a rebate system associated with gambling activities and, more particularly, to methods, systems, products, features, services, and other elements directed to user risk identification, risk mitigation and providing positive social outcomes in a gambling environment.

BACKGROUND

In many conventional gambling institutions, an agent is tasked with identifying and bringing in individuals to engage in the gambling services provided by the conventional gambling institutions. This circumstance is sometimes necessitated by the underground nature of the institutions. In these situations, as much as 50% of the proceeds collected by the institutions from those individuals identified by the agent may be paid back to the agent in exchange for the agent's services. Conversely, a gambling institution, such as a sportsbook, that operates above board may not require an agent's services and might instead provide a rebate to the individual that must be used on additional gambling. Alternatively, the sportsbook may keep all of the proceeds generated from individuals who place wagers there. However, such sportsbooks are failing to capture the majority of the underground market.

Gambling activity can have negative social impacts when bettors wager more than they can afford. Often, this is a problem that escalates after a sequence of losing bets, which can lead to continued gambling, often with increased wagers. This behavior is sometimes referred to as "chasing."

Further, gambling on sports is typically not endorsed by the leagues that promote sporting events, such as the National Football League ("NFL"). A first issue with leagues endorsing sports gambling is the ease in which individuals may place wagers on sporting events. Unlike other gambling options such as slot machines that are limited to casinos, individuals that place wagers on sporting events may simply place a wager of any value, at any time, on a sporting event with minimal obstruction. In doing so, individuals may easily allocate funds to wagers on sporting events when those funds should be allocated to paying living expenses, such as rent or utilities.

A second issue with leagues endorsing sports gambling is a fear by the leagues, such as the NFL and Major League Baseball ("MLB"), that individuals would allocate their funds to placing wagers on sporting events rather than allocating those funds to benefit the leagues, such as purchasing tickets to attend the sporting events, merchandise, memorabilia, etc. As a result, the leagues may then observe a drop in earnings due to individuals placing wagers on sporting events rather than executing purchases that benefit the leagues.

SUMMARY

Embodiments of the present disclosure relate to a system that provides safeguards and creates positive social impacts within a sports gambling environment. Rather than distributing as much as 50% of the proceeds generated from users wagering on sporting events, as discussed above, a customized gaming rebate system may be utilized. The customized gaming rebate system is not reliant on an agent to drive users to the system, eliminating the need for an agent and their associated fees. Instead, a portion of the proceeds generated from the users wagering on sporting events may be routed back to the users in the form of customized rebates.

These benefits and others can be obtained by way of a computing device that determines a gaming rebate allocation that is personalized and automatically updated for individual users in real-time, based on risk indicators corresponding to the user's wagering activity, among other factors. For instance, the computing device may determine that a relatively high-risk user's gaming rebate should be allocated to user's living expenses or other debts, rather than, for example, additional wagers. As another example, the computing device may automatically allocate the gaming rebate of a relatively low-risk user to purchases that will benefit the sports leagues that promote the sporting events, or to charities and other social causes selected by the user.

In one embodiment, the computing device may determine a predictive numerical value that quantifies the risk associated with the wagering activity of a user. This numerical value may be referred to as a "Wager Score™" and may be determined based on an algorithm that considers the financial characteristics and behavioral characteristics of the user. Based on the user's Wager Score™, the computing device may determine a customized gaming rebate that corresponds to the user and may route funds according to the customized gaming rebate. Further, the user's Wager Score™ may be continually updated based on the user's ongoing wagering activity.

For example, the computing device may determine a user's Wager Score™ based on the user's financial characteristics (e.g., income and household size), as well as behavioral characteristics (e.g., past wagering activity). Thereafter, computing device may update the user's Wager Score™ based on the user's wagering activity or other financial changes, and then update the customized gaming rebate accordingly.

In another embodiment, the computing device may aggregate data surrounding the wagering activity of a relatively large set of users. The computing device may also identify instances of negative financial outcomes within the set of users and may compare the negative financial outcomes with the associated wagering activity. In this way, the computing device may analyze and improve the predictive quality of the algorithm(s) that are used to determine the Wager Score™.

For example, the computing device may determine that a certain wagering activity, such as a wagering frequency that exceeds a certain threshold, is more predictive of the negative financial outcomes seen in the data set than other factors that may be receiving similar weight in the algorithm(s).

Based on this determination, the computing device may update the Wager Score™ algorithm(s) by increasing the weight attributed to a wager frequency that exceeds the threshold.

As indicated above, the examples provided herein relate to a system that provides safeguards and creates positive social impacts within a sports gambling environment. In one aspect, a computing device is provided. The computing device includes a processor, and memory having stored thereon instructions executable by the processor to cause the computing device to perform functions. The functions include receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

In another aspect, a non-transitory computer readable memory is provided. The non-transitory computer readable memory has stored thereon instructions executable by a computing device to cause the computing device to perform functions. The functions include receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

In yet another aspect, a method is provided. The method involves receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

While some examples described herein may refer to functions performed by given actors such as “users” and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

BRIEF DESCRIPTION OF THE DRAWINGS

Features, aspects, and advantages of the presently disclosed technology may be better understood with reference to the following description, appended claims, and accompanying drawings where:

and

Figure 5:
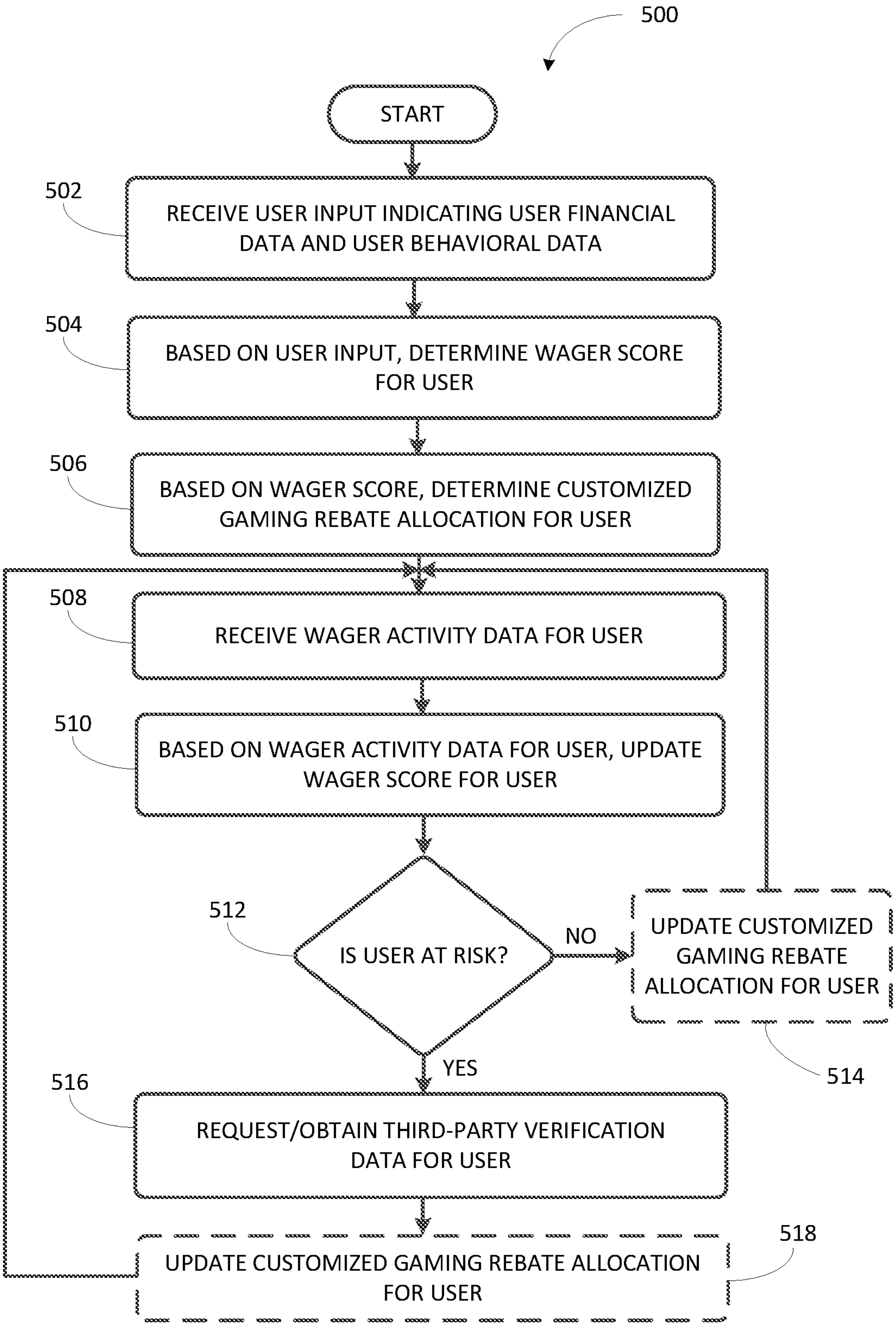

FIG. 5 shows an example flow diagram for determining a customized gaming rebate.

The drawings are for the purpose of illustrating example embodiments, but it is understood that the inventions are not limited to the arrangements and instrumentalities shown in the drawings.

DETAILED DESCRIPTION

Disclosed examples will now be described more fully with reference to the accompanying Figures, in which some, but not all, of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

I. SYSTEM OVERVIEW

Figure 1:
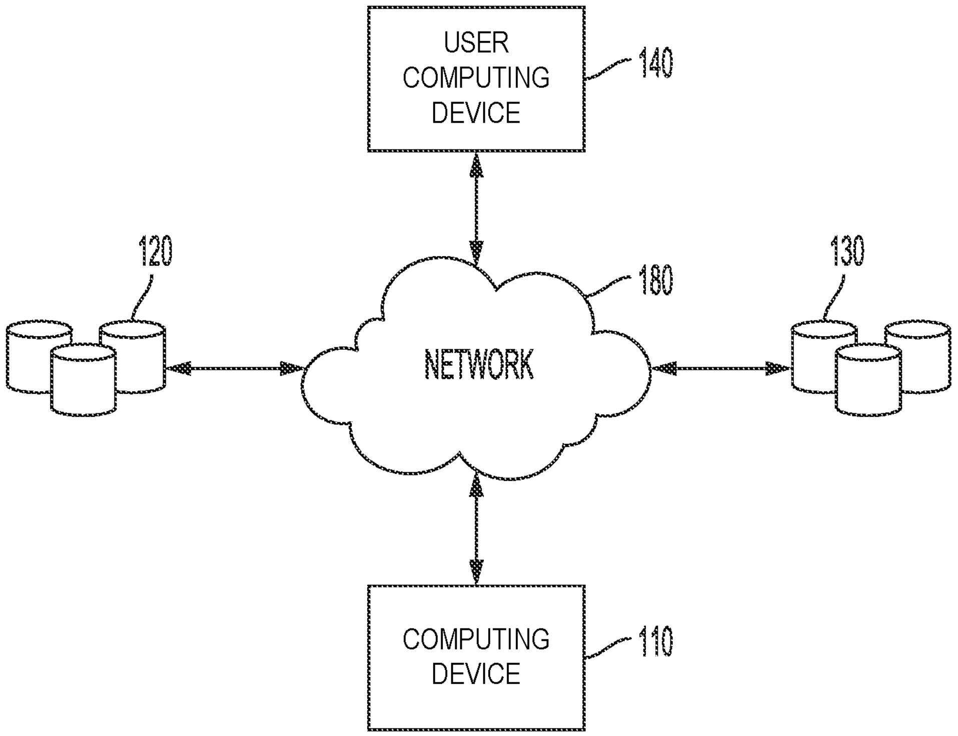
FIG. 1 shows an example of a customized gaming rebate system in which certain embodiments may be practiced.

As shown in FIG. 1, a customized gaming rebate system 100 includes a computing device 110 that is interconnected with various other components via a network 180. The system 100 includes one or more a gaming platform server(s) 120 that transmit data to the computing device 110 via the network 180. For example, the gaming platform server(s) 120 may be operated by one or more gaming platforms, such as a sportsbook, for receiving wagers associated with sporting events. The gaming platform server(s) 120 may transmit user activity data (e.g., wagering activity, losses, deposits, withdrawals, etc.) to the computing device 110.

Further, the system 100 includes a user computing device 140 through which a user may interface with the computing device 110 and/or the gaming platform server(s) 120 when engaging in wagers on sporting events. Examples of a user computing device 140 may include a smartphone, tablet, or similar networked device (e.g., a networked computer such as a PC or Mac™) among other possibilities. In practice, numerous user computer devices 140, corresponding to numerous users, will participate in the system 100.

As shown, wager data and customized gaming rebate data may be transmitted between numerous user computing devices 140 and computing device 110 via network 180. Network 180 includes one or more networks, such as the Internet. In some embodiments of the present disclosure, network 180 may include one or more wide area networks (WAN) or local area networks (LAN). Network 180 may utilize one or more communication protocols (e.g., infrared, radio, wired standards including IEEE 802.3, wireless standards including IEEE 802.11a, 802.11b, 802.11g, 802.11n, 802.11ac, 802.15, 4G mobile communication standard, and so on). Each of the numerous user computing devices 140 may interface with computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

In some embodiments, the computing device 110 may also obtain data from additional, external data sources 130, also shown in FIG. 1. In some embodiments, the external data sources 130 may include publicly available data that may be used to verify some aspects of self-reported user information. Additionally, when a user's wagering activity indicates increased risk, the user may be prompted to provide the computing device 110 with the ability to access additional external data sources 130, which may include a credit report and income verification.

Based on the data received from other components of the system 100, the computing device 110 determines a Wager Score™ for a given user, as discussed below in Section II. For instance, a relatively high Wager Score™ may correspond to a relatively low-risk user, whereas a relatively low Wager Score™ may correspond to a relatively high-risk user. Based on the determined Wager Score™, the computing device 110 determines a customized gaming rebate allocation for the given user that is tailored to the user's risk profile, as discussed below in Section III.

Figure 2:
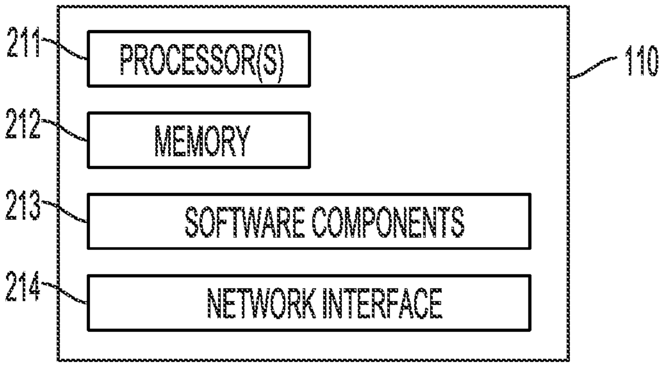
FIG. 2 shows a functional block diagram of an example computing device.

FIG. 2 shows a functional block diagram of an example computing device 110. The computing device 110 may include, for instance, one or more processors 211, memory 212, software components 213, and a network interface 214. The one or more processors 211 may be configured to perform functions relevant to facilitating interactions with the system 100 via the network interface 214. The memory 212 may be configured to store instructions executable by the one or more processors 211 to perform those functions. Further, the memory 212 may be data storage that can be loaded with one or more of the software components 214 executable by the one or more processors 211 for determining a Wager Score™ and a customized rebate allocation for individual users.

In practice, the computing device 110 may be represented by one or more computing devices operating in parallel or in series, or both. For example, the computing device 110 may take the form of a distributed network of computing devices, servers, databases, and the like, which may each perform, in part or in whole, some or all of the operations discussed herein.

As used herein, a sporting event is an event where different entities compete against each other and there is a decidable outcome of the event-typically involving at least a first entity winning the event and at least a second entity losing the event. Wagers associated with the sporting events may be associated with any outcome that may occur during the sporting events, such as but not limited wagers on the winner of the sporting event, the point spread of the sporting event, the over/under of points scored during the sporting event, individual achievements of players participating in the sporting event, among other possibilities.

As noted above, the sports leagues that promote the sporting events have been reluctant to sponsor conventional gambling associated with the sporting events. Sports leagues may include but are not limited to the NFL, the MLB, the National Basketball Association ("NBA"), the National Hockey League ("NHL"), the National Collegiate Athletic Association ("NCAA") and/or any other sports league that promotes sporting events that involve entities participating in the sporting events that will be apparent to those skilled in the relevant art(s) without departing from the spirit and scope of the invention.

II. EXAMPLE WAGER SCORE™ DETERMINATIONS

As discussed above, a user's Wager Score™ may represent the likelihood that the user will engage in wagering activity that may have negative financial and social outcomes. Because it is based on significant existing wagering activity data sets that have been used to isolate specific metrics that have predictive capability, the Wager Score™ can advantageously be used as a leading indicator of future problems.

The computing device 110 may determine a Wager Score™ for a given user based on a number of factors. These may include financial data and behavioral data related to the user. For example, the data utilized in determining the Wager Score™ may include self-reported information provided by the user, third-party data from external sources, and ongoing data related to the user's wagering activity.

For instance, the computing device 110 may provide a rebate service platform that facilitates the customized gaming rebates discussed herein. When a user first signs up to use the rebate service platform, the user's initial Wager Score™ may be determined based on information that is largely self-reported by the user. Some examples include self-reported values for credit score, annual income, and household size, among other minimal identifying information, such as name, age, and zip code. Further, the new user may answer questions in a brief survey inquiring into his or her gambling history, which may be used as a baseline for the user's wagering behavior.

The gambling history survey may include questions related to the frequency that the user engages in any type of gambling, the amount of funds the user allocates when engaging any type of gambling, the amount of losses in funds that the user loses when engaging any type of gambling, the size of each wager that the user implements when engaging in any type of gambling, the amount of financial debt that has resulted from any of the user's gambling, and similar questions. Other information may be collected as well.

Based on the above information, the computing device 110 may determine an initial Wager Score™ for the new user, which may be referred to as a Welcome Wager Score™ (WWS). The computing device 110 may utilize a linear weighting algorithm to adjust the relative importance of each component, such as the following example:

$$WWS=Cs(Wc)+Fs(Wf)+Gs(Wg)$$

For example, the self-reported credit score (CS) may be weighted by a variable (Wc) that is obtained from a lookup table. In some cases, the values of CS may be stratified into tiers (e.g., excellent, good, average, etc.). Similarly, the ratio (Fs) of self-reported annual income to household size may be weighted by a variable (Wf) that is also obtained from the lookup table. Further, a score (Gs) may be assigned based on the user's answers to the gambling history survey, which is weights by a variable (Wc), again obtained from the lookup table.

In many cases, the WWS will be most heavily weighted by the self-reported credit score and the adjusted income/household size ratio. Nonetheless, the weight variables found in the lookup table may be adjusted on an ongoing basis based how well each component predicts actual negative financial outcomes, as discussed further below. This adjustment creates a feedback loop which may improve the predictive quality of the WWS over time.

In some implementations, self-reported values may be compared to publicly available resources to normalize extreme values, and/or flag potentially misreported information. For instance, the computing device 110 may compare a user's self-reported annual income against the user's age and publicly available census and tax statistics for the user's zip code. Self-reported values that show extreme variation from the normalized distribution for the area may be adjusted back toward the mean, with greater adjustments for more extreme values. Further, self-reported income values may be adjusted using the cost of living index for the zip code in question.

As users place wagers, the computing device 110 receives a wealth of information about their wagering activity, deposits, and withdrawals. This activity data is aggregated and analyzed and compared with internal benchmarks that are used to predict future member behavior. Further, it allows the computing device 110 to update the user's Wager Score™ to become more focused on user wagering activity, and less reliant on self-reported data.

Further, some users will demonstrate significant wager volume or have patterns that indicate that the user may be at risk, which may trigger additional data feeds to be incorporated. The inclusion of these external data feeds allows the computing device 110 to verify aspects of the previously self-reported data. However, these data feeds, including credit reports with associated income and debt verification, require the user to provide the computing device 110 authorization to access them.

In some implementations, the computing device 110 may send a notification to the gaming platform server(s) 120 indicating that additional user information is required to continue placing wagers. The associated gaming platforms may then flag the users in their own systems, such that additional wagers cannot be placed until the information is provided. Once the information is provided, the computing device 110 may obtain, for example, a credit report that includes income verification for the user.

Based on this additional information, the computing device 110 may refine its determination of the user's Wager Score™, which may be referred to as a Verified Wager Score™ (VWS). As above, the computing device 110 may utilize a linear weighting algorithm, such as the following:

$$VWS=(L/I)(Wi)+\Delta(W/b)(Wb)+\Delta(df)(Wd)+\Delta(Wf)(Ww)+Ca(Wc)$$

where:

(L/I) represents a ratio of wagering losses to income;

Δ(W/b) is a measure of how wager amount versus gaming platform account balance has changed over time;

Δ(df) is a measure of how gaming platform deposit frequency has changed over time;

Δ(Wf) is a measure of how wager frequency has changed over time;

Ca represents an actual credit score, or credit score tier; and

The variables Wi, Wb, Wd, Ww, and Wc are each weighted variables, obtained from a lookup table and used to adjust the relative importance of each component.

As with the WWS, the VWS algorithm makes heavy use of dynamic weighting. Every component is assigned a weight from the lookup table, which are tuned using outcome data on an ongoing basis.

The ratio of wagering losses to income, (L/I), is a primary leading indicator of risk potential. The computing device 110 receives data relating to wagering losses, as well as data feeds for user wager activity, and gaming platform account deposits and withdrawals from the gaming platform server(s) 120. Initially, a user's income is determined using the same data as it was in the WWS-a combination of self-reported values and adjustments based on ZIP code. However, once additional external data feeds have been obtained, the computing device 110 can verify a user's income via third-party sources.

Income level is also used to determine loss tolerance tiering for individual users. How much money an individual earning $50 k/year can lose before being at financial risk is much different than how much money an individual who earns $500 k/year can lose. Household size also plays into this tiering calculation. Some users with very high verified income levels may never be flagged as at risk due to this tiering schedule.

Further, changes in deposit pattern and frequency, Δ(df), and wager pattern and frequency, Δ(Wf), are often indicative of sudden changes in the financial state of a user. Users that have previously been consistent in their wagering activity may be exhibiting high-risk behavior if these patterns alter rapidly. This can be especially predictive if the user has had recent losses. In some embodiments, the computing device 110 may utilize machine learning models to determine what combinations of these changes are predictive, and then factor that into the VWS.

In some embodiments, once the computing device 110 has flagged a user as at risk, the computing device 110 may automatically obtain periodic credit reports for the user. This serves at least three purposes. First, a user's Wager Score™ will be updated periodically based on additional wagering data, and an actual credit score, if available, is one of the weighted components of the VWS calculation discussed above. Second, it provides the computing device 110 with access to actual outcome data for at risk users that can be used to validate the predictive capability of the VWS and tune the entire model. For example, a user's credit report may include information regarding past-due bills, increasing debt, liens, judgments, bankruptcies, among other negative financial outcomes that a user may encounter.

Third, the credit report provides a list of the user's debt accounts. For example, in the event that the computing device 110 determines a gaming rebate allocation that routes rebates toward a user's debts (e.g., living expenses such as mortgage, rent, utilities, etc.), the computing device 110 can use this third-party information to verify such debt accounts and reduce the likelihood of fraudulent rebate routing.

The example VWS algorithm discussed above presents one possible way to incorporate a user's wagering activity into the user's Wager Score™. In other examples, a VWS algorithm may include more or fewer components, or "signals" that may be realized. For instance, the computing device 110 may include data for wagers that the user makes that have substantially low odds of success (e.g., odds below a given risk threshold, such as 10:1), which may be a predictor of high-risk behaviors. In such a situation, data from conventional odds publishers may be incorporated. Additionally or alternatively, the computing device 110 may include or be in communication with a sports prediction API that generates wagering odds on sporting events.

III. EXAMPLE CUSTOMIZED GAMING REBATE ALLOCATIONS

As noted above, computing device 110 may determine a customized gaming rebate for a user. The customized gaming rebate may be a portion of the net proceeds obtained by the gaming platform from the user's wagering activities. Thus, increased user wagers associated with sporting events or other gambling may, in some instances, result in an increase in net gaming platform proceeds, which then results in an increased customized gaming rebate to the user.

However, rather than simply giving the user a rebate to be used for any purpose (e.g., additional wagers), the computing device 110 may automatically determine how the user may allocate the customized gaming rebate based on the wager score of the user. As discussed in further detail below, a relatively low wager score may represent a user that is at risk of struggling to pay for their own living expenses or other debts. In such an example, the computing device 110 may limit the user to allocating the customized gaming rebate to the living expenses of the user. This prevents the user from allocating the customized gaming rebate to additional wagers on sporting events, among other things. In doing so, the computing device 110 may provide a safeguard that has not previously existed in the gambling environment.

A relatively higher wager score may represent a user that is not in financial risk. In such an example, computing device 110 may provide the customized gaming rebate to the user, but require that the user allocate the customized gaming rebate to one or more charities or social causes of the user's choice. In some cases, a user may indicate a favorite player or players on a preferred sports team, and the portion of the user's rebate that is allocated to charitable causes may be routed to a cause established by or supported by the player.

Additionally or alternatively, the computing device 110 may require that the user allocate the customized gaming rebate to purchases that will benefit a given sports league that the user wagered on, such as tickets to sporting events for the user's preferred team, clothing associated the sports league, memorabilia associated with the sports league, and so on. In such an example, computing device 110 may automatically determine the amount of the customized gaming rebate that the user is to allocate to purchases that benefit the sports league and in doing so, ensure that the user continues to make purchases that benefit the sports league despite allocating funds to wagers associated with sporting events promoted by the sports league.

In some embodiments, the computing device 110 may determine whether the wager score of the user is lower than a living expense threshold. The living expense threshold may represent the Wager Score™ value below which the computing device 110 will allocate the user's customized gaming rebate to the user's living expenses. For example, the computing device 110 may define a Wager Score™ threshold of 3.34, such that any Wager Score™ less than 3.34 results in an allocation profile in which all or virtually all of a user's customized gaming rebate being allocated to living expenses.

For instance, the computing device 110 may determine that the customized gaming rebate for the user is to be allocated to a living expense account. The living expense account is an account associated with satisfying a living expense for the user and, if applicable, the user's family. The living expenses for the user may include obligations such as the rent, the mortgage, the utility bills, the grocery bills, the car payment, school fees, and the like. The living expense account may be an account that is not within the user's control, such that the customized gaming rebate can be allocated to the living expense account to satisfy the living expense without any interference from the user. For example, the living expense account may be held by a rental company that the user is required to pay monthly.

The computing device 110 may determine additional Wager Score™ thresholds as well, each with corresponding allocation profiles for a user's customized gaming rebate. For example, a Wager Score™ above 3.34 but below 6.67 may have a corresponding rebate allocation profile that directs 70% of a user's customized gaming rebate to charities or other social causes of the user's choice, and the remaining portion to a sports league account for the benefit of the sports league that the user wagered on, as discussed above. In this way, the computing device 110 may provide for a positive social outcome through the charitable donation. This may also provide a financial benefit for the user, as such charitable donations might be tax deductible for the user.

In some implementations, a user may be able to elect multiple charities or social causes such that the customized gaming rebate allocated toward charities is divided equally among them. Thus, two selected charities might receive 35% each of the user's customized gaming rebate. In other examples, a user may be able to direct a larger portion to a preferred charity. For example, 80% of the customized gaming rebate's charitable allocation in the example discussed above (e.g., 60% of the total rebate) may be directed to a preferred charity or social cause, while the remaining 20% (e.g., 15% of the total rebate) is directed to a second charity. Other allocations are also possible.

As another example, a Wager Score™ between 6.67 and 9.00 may correspond to higher net worth individuals that have little or no financial risk. The customized gaming rebate allocation profile in such cases may include a higher percentage of the rebate allocated toward sports league accounts.

In some embodiments, a user may specify a preference for certain sports league purchases over others. For example, the user may prioritize tickets to sporting events as the top priority, followed by clothing, while not prioritizing memorabilia. Accordingly, the computing device 110 may allocate a percentage of the customized gaming rebate to a sports league account associated with ticket purchases while allocating the remaining percentage of the customized gaming rebate to a sports league account associated with purchasing clothing associated with the sports league.

In some implementations, a user may place wagers on sporting events associated with multiple different sports leagues. In such scenarios, the computing device 110 may determine, from a plurality of wagers engaged by the user, a percentage of the total wagers placed by the user that is associated with each sports league. For example, the user may deposit $1,000 to be allocated to wagers on different sporting events, and may allocate $800 to football games promoted by the NFL and $200 to baseball games promoted by the MLB. The computing rebate computing device 110 may then determine that 80% of the wagers engaged by the user were allocated to the NFL and 20% of the wagers engaged by the user were allocated to the MLB.

The computing device 110 may then determine each customized gaming rebate for the user that is to be allocated to each sports league in proportion to the wagers associated with each sports league. For example, of the $1,000 that the user deposited to be allocated to wagers on the NFL and MLB sporting events, computing device 110 determines that a $400 customized gaming rebate is to be allocated to sports league accounts for the user to make purchases. The user allocated 80% of the wagers to football games promoted by the NFL and 20% of the wagers to baseball games promoted by the MLB. Thus, the computing device 110 may allocate $320 of the $400 customized gaming rebate to sports league accounts associated with purchases that benefit the NFL and $80 of the $400 customized gaming rebate to sports league accounts associated with purchases that benefit the MLB.

In some implementations, the computing device 110 may determine an allocation profile in which a portion of the customized gaming rebate may be allocated to additional wagers, sometimes referred to in the industry as "free play." For instance, the user may be required to use the portion of the rebate to make additional wagers with the same gaming platform that the user engaged for the previous wagers. In this regard, the range of Wager Score™ values may include an additional wager threshold, or "free play" threshold, above which the computing device 110 may allocate some of the customized gaming rebate toward additional wagers.

Similar to the Wager Score™ itself, the rebate allocation profiles discussed above may reflect the risk level of the user. For example, a Wager Score™ value below the living expense threshold may correspond to the high-risk allocation profile discussed above, forcing the customized gaming rebate to be used on living expenses. In some embodiments, as the Wager Score™ increases to levels of lesser risk, the allocation profiles may allow for some increased flexibility in the allocation of gaming rebates such that the user can choose how to apportion the rebate among available choices. For instance, the computing device 110 may determine a Wager Score™ for a given user that is 5.5, which may indicate medium financial risk for the user. The user may then be presented with the option of allocating anywhere between 70%-100% of the customized gaming rebate toward charities, and anywhere between 0%-30% of the rebate toward sports league purchases. Higher Wager Score™ values, corresponding to lower risk for users, may include larger range options, as well as additional routing choices.

Numerous other routing destinations for a portion of a user's customized gaming rebate are also possible, including merchants other than those noted above. Further, more or fewer thresholds than those discussed above can be implemented.

A user's Wager Score™ may be adjusted dynamically based on at least the user's wagering activity. For example, if a user's Wager Score™ crosses a given threshold, the customized gaming rebate allocation profile may be adjusted accordingly. This adjustment of the allocation routing profile can occur relatively quickly, such that rebate monies can be diverted accordingly. This enables the computing device 110 to minimize the time between the detection of negative signals and mitigation of that activity. For instance, this may allow the computing device 110 to identify and curtail instances of "chasing" at the first signs of a downward wagering spiral. The dynamic adjustment of Wager Scores™ may also enable gaming platforms to react quickly to address that same signal.

Due to the potentially frequent updating a user's Wager Score™ and customized rebate allocation profile, it may be desirable for the computing device 110 to facilitate a system for accurate rebate accounting. In one possible implementation, the computing device 110 may associate each wagering activity and each profile update with a timestamp. For example, if a user's Wager Score™ changes based on wagering activity, or the user adjusts their preferred charity, rebates resulting from wager activity that occurred prior to these changes may still allocated according to the profile that was in place prior to the change.

Figure 3:
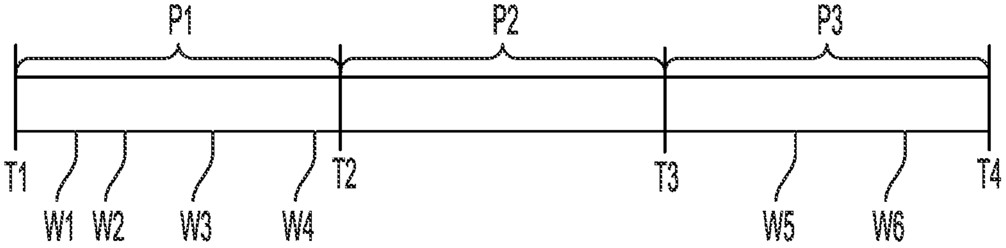
FIG. 3 shows a timeline of wagering activity and rebate profiles, according to an example implementation.

FIG. 3 shows one example of how such a profile versioning system might be implemented. In FIG. 3, a timeline is illustrated that may span a total of 72 hours between times T1 and T4. During this time period, a user placed a total of six wagers, W1-W6. These wagers were associated with a total of three customized gaming rebate allocation profiles P1-P3. The first profile P1 was in place from time T1 until T2, and the first four wagers W1, W2, W3, and W4 were made while P1 was in place. Thus, any rebates resulting from wagers W1-W4 will be calculated and allocated using the first profile P1.

At time T2, the user's Wager Score™ was updated based on the user's wagering activity, which resulted in a second customized rebate allocation profile P2 that was effective beginning at time T2. The computing device 110 may perform this update automatically at repeating intervals by requesting the wagering activity data from the gaming platform server(s) 120. Various other update frequencies and synchronization options between the gaming platform server(s) 120 and the computing device 110 are also possible. In addition to the user's Wager Score™ being updated at time T2 and the second profile P2 becoming effective, the computing device 110 may create a copy of the first profile P1. The copy of the first profile P1 may be saved in memory 212 at the computing device 210 and used to correctly allocate rebates that result from wagers made while profile P1 was in effect. Further, preserving the prior profile versions in this way may have the added benefit of providing a clear ledger of how and why certain rebates are allocated. This data may be accessible by users to preserve transparency, as well as to support financial audits.

After time T2, the user did not place any more wagers while the second profile P2 was in effect. At time T3, the user modified their charitable selections, resulting in a third customized rebate allocation profile P3 that was became beginning at time T3. Again, the computing device 110 may save a copy of the second profile P2, such that an ongoing version history of the user's customized rebate allocation profile history is created.

After time T3, the user placed two more wagers, W5 and W6, both while the third profile P3 was in effect. Thus, any rebates resulting from W5 or W6 will be allocated according to the third profile P3. As can be seen in FIG. 3, no wagers were placed while the second profile P2 was in effect, and thus no rebates will be calculated using the second profile P2. In some embodiments, the computing device 110 may clean up the user's version history by deleting unneeded versions of the profile history, such as the second profile P2.

In some cases, this cleanup may occur only after a threshold time period has passed. The threshold time period may be, for example, one month or one year.

FIGS. 4A through 4F illustrate a series of user interfaces that a user may interact with during the initial setup of a user account on the rebate service platform provided by the computing device 110. For example, the user may use the computing device 140, such as an example smartphone to navigate via an app through the account creation process depicted in FIGS. 4A-4F. Other user computing devices 140 are also possible, as discussed above, as are other user portals for accessing the rebate service platform of computing device 110, such as a webpage. The user computing device 140 communicates with the computing device 110 via the app or webpage over the network 180, as shown in FIG. 1.

Figure 4B:
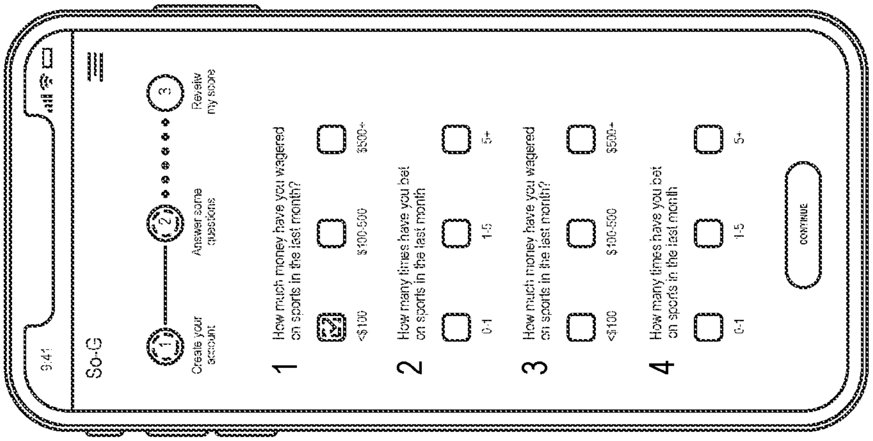
FIG. 4B shows another user interface, according to an example implementation.
Figure 4A:
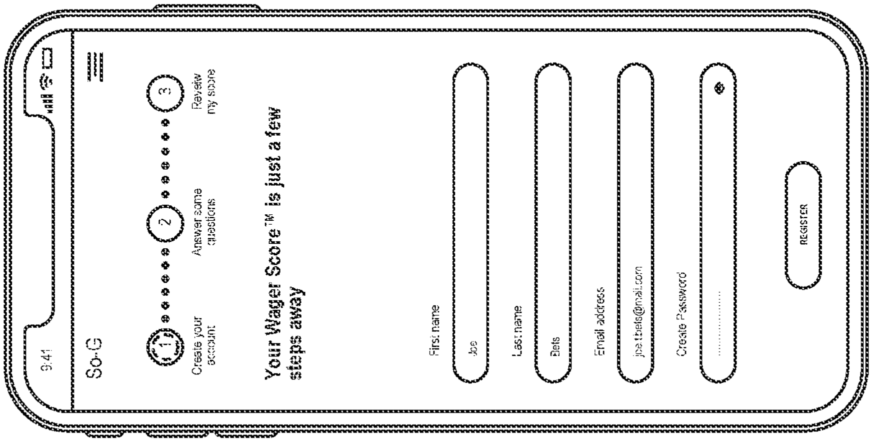
FIG. 4A shows a user interface, according to an example implementation.

In FIG. 4A, a user interface is shown that prompts the user to enter some identifying information, including a name, email address, and password that will be used to access the user's account. At this stage in the signup process, additional screens may also prompt the user for additional information, such as address, zip code, and a self-reported credit score and household size, as discussed in the examples above.

Once the user enters the required information in FIG. 4A, and any other required information, the user may proceed to FIG. 4B where a number of survey questions are posed regarding the user's gambling history, as noted previously. These questions might be more granular or less granular than the examples shown, and there may more question than seen in FIG. 4B. As discussed above, this data will be used by the computing device 110 to determine, relatively quickly, a WWS for the user.

Figure 4D:
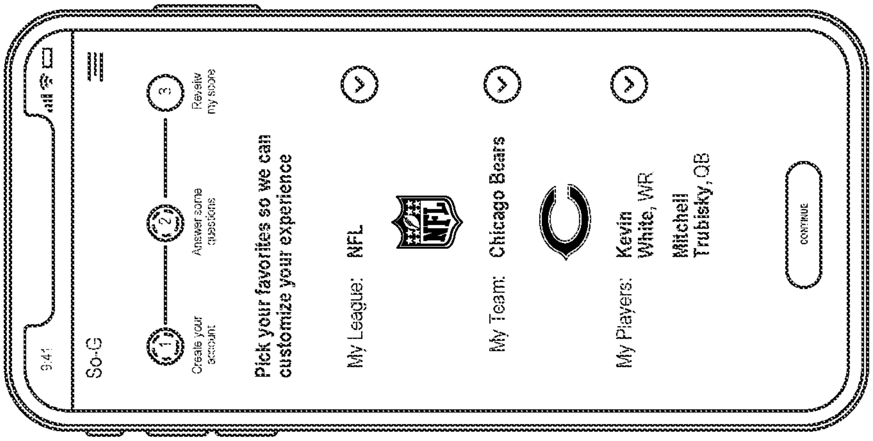
FIG. 4D shows another user interface, according to an example implementation.
Figure 4C:
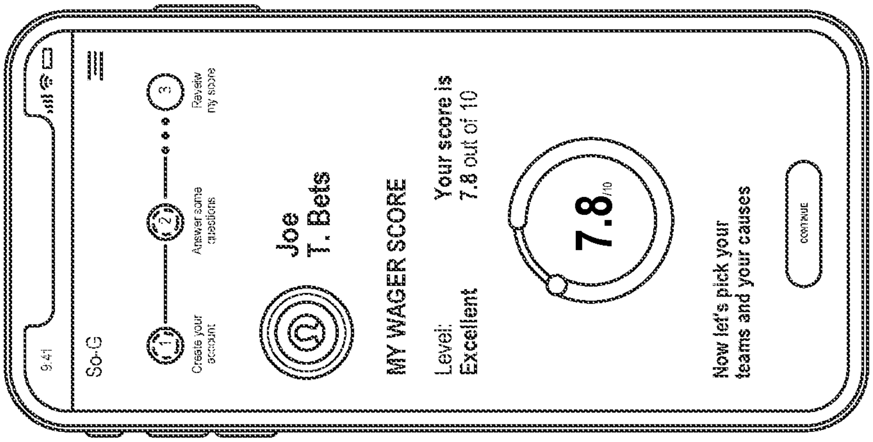
FIG. 4C shows another user interface, according to an example implementation.

For instance, FIG. 4C shows a user interface displaying the user's Wager Score™ as determined by the computing device 110. Further, the user interface of FIG. 4C prompts the user to continue to making selections of preferred teams and causes, which the computing device will use to determine the customized gaming rebate allocation.

FIG. 4D shows a user interface for selecting a preferred sports league, sports team, and players on the sports team. These will be used by the computing device 110 if it determines that a portion of the customized gaming rebate is to be allocated to purchases associated with the sports leagues, as discussed above. In some embodiments, the sports league and/or sports team selections may be pre-populated based on the user's zip code. Further, the user interface shown in FIG. 4D may allow the user to select multiple teams, and multiple leagues, as favorites.

Figure 4F:
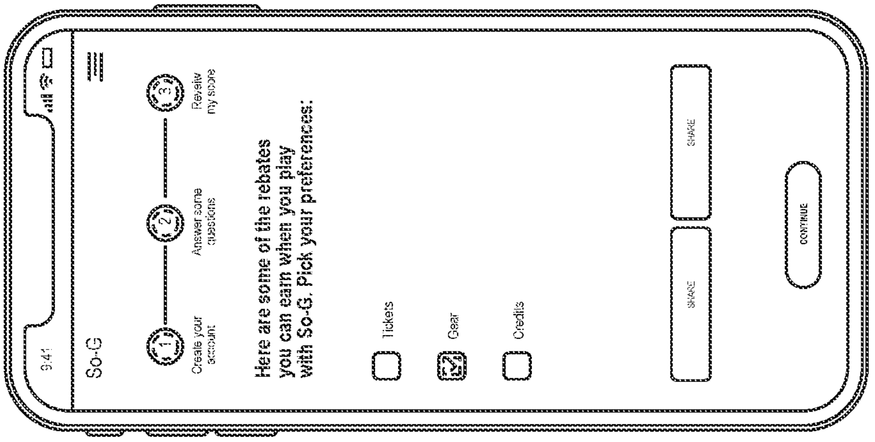
FIG. 4F shows another user interface, according to an example implementation.
Figure 4E:
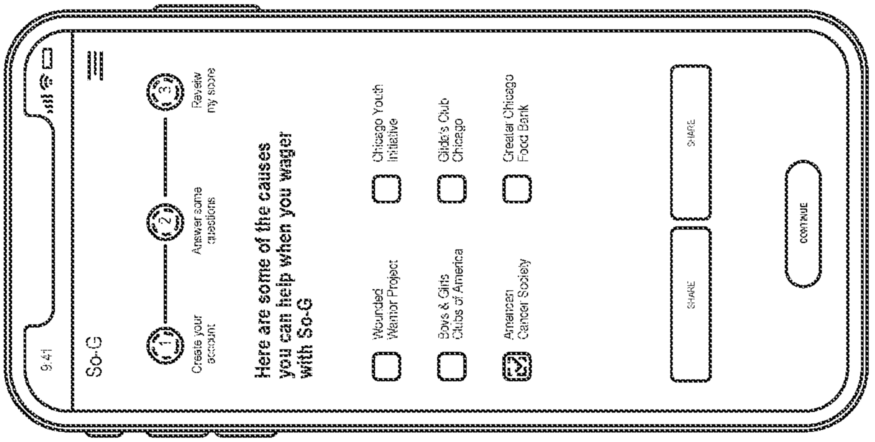
FIG. 4E shows another user interface, according to an example implementation.

Similarly, FIG. 4E shows a user interface for selecting preferred charitable causes. These will be used by the computing device 110 if it determines that a portion of the customized gaming rebate is to be allocated to such causes, as discussed above. As with the sports leagues, the charitable causes may be pre-populated, in whole or in part, based on the user's zip code. In other situations, the rebate service platform of computing device 110 may promote other charitable causes at certain times (e.g., Red Cross donations for victims of a recent hurricane), and may suggest these causes to the user.

FIG. 4F shown another user interface in which the user may specify preferences for how the user would like certain gaming rebates prioritized. For example, the user might prefer tickets to sporting events involving the user's preferred team, or gear/merchandise corresponding to the team. In some cases, the user may be able to specify a preference for the gaming rebate to be allocated to credits for placing additional wagers, if such an allocation is available to the user, as discussed above.

A user may return to one or more of the user interfaces discussed above at a later time, if they wish to adjust their preferences. Further, a user's account on the rebate service platform may include a user profile that includes any of the information discussed herein, such as the user's wagering activity, the user's verified and/or unverified financial information, and a rebate allocation profile version history, among other information.

Turning now to FIG. 5, and example flowchart for determining a customized gaming rebate allocation is shown. The method 500 shown in FIG. 5 presents an embodiment of a method that can be implemented by a computing device, such as the computing device 110, within a gambling environment such as the customized gaming rebate system 100 FIG. 1. The method 500 may include one or more operations, functions, or actions as illustrated by one or more of blocks 502-518. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, the method 500 includes receiving user input indicating user financial data and user behavioral data. This may represent a user's initial signup for the gaming rebate service platform, and the user input may indicate the data discussed in the examples above and shown by way of examples in at least FIGS. 4A and 4B.

At block 504, based on the user input received at block 502, the computing device 110 may determine a Wager Score™ for the user. As noted above, this determination may be a WWS, and may be based largely on the self-reported data provided by the user. At block 506, based on the determined Wager Score™, the computing device 110 may determined a customized gaming rebate allocation for the user. This customized gaming rebate allocation may also take into account user preferences, as discussed and shown generally in FIGS. 4D-4F, however, the Wager Score™ may dictate the boundaries within which such allocations may be made, as noted in the examples above.

At block 508, the method 500 involves receiving wager activity data for the user. This wager activity data may be received from the gaming platform server(s) 120 shown in FIG. 1, and my include information regarding the frequency and amount of wagers made, losses, deposits, withdrawals, and the like from a user's gaming platform account. Based on the wager activity data, the computing device 110 may update the Wager Score™ for the user at block 510.

As discussed above, the wager activity data and the updated Wager Score™ for the user may indicate that the user is not at risk of a negative financial outcome as a result of their wagering activity. At block 512, the computing device may determine that the user is not at risk, and may proceed to optionally update the customized gaming rebate allocation for the user at block 514, if the updated Wager Score™ indicated that an allocation adjustment is appropriate. The computing device 110 may then repeat blocks 508 through 514 so long as the computing device 110 continues to determine that the user is not at risk.

Alternatively, the computing device 110 may determine at block 512, based on the wagering activity and the updated Wager Score™ for the user that the user is at risk of a negative financial outcome. At block 516, the computing device 516 may request and obtain third-party verification data as discussed in the examples above. For example, the computing device 110 may prompt the user to provide the computing device with access to the user's credit report, which may be used to verify the user's income and debt accounts as necessary.

At block 518, the computing device 110 may update the customized gaming rebate allocation for the user, to reflect the user's high-risk status. For instance, the computing device 110 may reallocate all or substantially all of the user's rebate to the user's debt accounts, as noted above. As further wager activity is received by the computing device 110, the computing device 110 may reassess at block 512 whether the user is still at risk. If the user is still at risk, the computing device may again obtain the user's credit score to update the Wager Score™ for the user. In some cases, updating the customized gaming rebate allocation at block 518 might not be necessary, since the user remains in the high-risk allocation profile.

As noted above, the computing device 110 may obtain the third-party verification data by obtaining credit reports for users at other times, and for other purposes as well. For example, the third-party verification data may provide valuable outcome information that the computing device 110 may use to improve the predictive quality of the Wager Score™, and the overall performance of the rebate service platform.

IV. EXAMPLE UPDATES TO WAGER SCORE™ DETERMINATIONS

As discussed above, the computing device 110 may determine a Wager Score™ for a user based on financial data and behavioral data relating to the user, using dynamic weighting algorithms that assign relative values based on the predictive quality of different metrics within the data. Further, the computing device 110 may also track actual outcomes associated with many Wager Score™ determinations. In doing so, the computing device 110 may test the predictive quality of the previously determined Wager Score™ and the components thereof, in order the tune and refine future the algorithms for future Wager Score™ determinations.

When a user is determined to be at risk, the computing device 110 may obtain access, via the user, to data sources that may provide an indication of negative financial outcomes, as noted above. For example, the user may provide the computing device 110 with access to the user's credit report, which may indicate when the user is in financial distress. This may be compared to the user's previous wagering activity, which is also accessible by the computing device 110. Moreover, the computing device 110 may have access to similar data for numerous users of the system 100, providing the computing device 110 with a rich data set to mine for predictive metrics. The computing device may use machine learning algorithm types, such as linear regression, logistic regression, and naïve Bayesian models to determine that certain wagering activities are more predictive than others of the actual, negative financial outcomes that are observed. This allows for the self-correction and adjustment of the Wager Score™ algorithms toward better predictive capability.

For instance, the computing device 110 may determine that a high ratio of losses to income (L/I) is strongly predictive of future negative financial outcomes than other factors that contribute to the computing device's weighted VWS algorithm. As a result, the computing device 110 may adjust the weights corresponding to each of these factors in the algorithm by adjusting their values in the associated lookup table.

Conversely, the computing device 110 may determine that a given wagering activity or other factor is being assigned too much weight, and is not as predictive of negative financial outcomes as the algorithm currently treats it. Again, the algorithm may adjust the weight variables accordingly.

As another example, the computing device 110 may determine that a particular wagering activity is predictive of negative financial outcomes, but that the activity is not accounted for in the algorithm. As a result, the computing device 110 may revise the algorithm to account for the wagering activity in question.

This type of self-correction and adjustment is not limited to the Wager Score™ determination. The computing device 110 might also test the Wager Score™ threshold levels for the various rebate allocation profiles to determine if they should be set higher or lower. For instance, the computing device 110 might determine that the likelihood of a negative financial outcome increases sharply when a user's Wager Score™ drops below 4.0. Using this information, the computing device may increase the living expense threshold at which users are forced to allocate their customized gaming rebates to living expenses from 3.34 to 4.0. This update may increase the likelihood of the computing device 110 catching and preventing financial issues for the user.

V. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

As indicated above, the examples provided herein relate to a system that provides safeguards and creates positive social impacts within a sports gambling environment. In one aspect, a computing device is provided. The computing device includes a processor, and memory having stored thereon instructions executable by the processor to cause the computing device to perform functions. The functions include receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

In another aspect, a non-transitory computer readable memory is provided. The non-transitory computer readable memory has stored thereon instructions executable by a computing device to cause the computing device to perform functions. The functions include receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

In yet another aspect, a method is provided. The method involves receiving user-input financial data corresponding to a user and receiving user-input behavioral data corresponding to the user. The functions also include, based on the financial data and the behavioral data, determining a Wager Score™ for the user, where the Wager Score™ represents an estimate of financial risk of the user. The functions also include, based on the Wager Score™, determining a customized gaming rebate allocation corresponding to the financial risk of the user, where the customized gaming rebate allocation designates one or more recipients, other than the user, for a gaming rebate assigned to the user. The functions also include receiving the gaming rebate and, after receiving the gaming rebate, distributing the gaming rebate to the one or more recipients according to the customized gaming rebate allocation.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:

at least one processor;

non-transitory computer-readable medium; and program instructions stored on the non-transitory computer-readable medium that are executable by the at least one processor such that the computing device is configured to:

obtain financial data corresponding to a user;

based on at least the obtained financial data corresponding to the user, determine an initial risk score for the user that represents an estimate of financial risk of the user;

receive, from a computing system associated with a gaming platform, wagering activity data corresponding to wagers placed by the user via the gaming platform;

based on at least the received wagering activity data, determine an updated risk score for the user that indicates an increased estimate of financial risk; and based on determining the updated risk score, transmit one or more messages that collectively (i) cause the computing system associated with the gaming platform to temporarily suspend wagering activity by the user via the gaming platform and (ii) cause a user device associated with the user to display (a) a notification that wagering activity has been temporarily suspended and (b) a request for user-input data to resume wagering activity.

2. The computing device of claim 1, wherein the computing system associated with the gaming platform is a first computing system associated with a first gaming platform, the computing device further comprising program instructions stored on the non-transitory computer-readable medium that are executable by the at least one processor such that the computing device is configured to:

based on determining the updated risk score, transmit a second one or more messages to a second computing system associated with a second gaming platform, wherein the second one or more messages collectively cause the second computing system associated with the second gaming platform to temporarily suspend user wagering activity by the user via the second gaming platform.

3. The computing device of claim 1, further comprising program instructions stored on the non-transitory computer-readable medium that are executable by the at least one processor such that the computing device is configured to:

receive, from the user device, the requested user-input data; and based on receiving the requested user-input data, transmit a second one or more messages to the computing system associated with the gaming platform, wherein the second one or more messages collectively cause the computing system associated with the gaming platform to unsuspend user wagering activity by the user via the gaming platform.

4. The computing device of claim 3, wherein the program instructions that are executable by the at least one processor such that the computing device is configured to determine the updated risk score for the user that indicates the increased estimate of financial risk comprise program instructions that are executable by the at least one processor such that the computing device is configured to determine a first updated risk score that exceeds a first threshold, the computing device further comprising program instructions stored on the non-transitory computer-readable medium that are executable by the at least one processor such that the computing device is configured to:

after receiving, from the user device, the requested user-input data, receive, from the computing system associated with the gaming platform, additional wagering activity data corresponding to additional wagers placed by the user via the gaming platform;

based on at least the received additional wagering activity data, determine a second updated risk score for the user that exceeds a second threshold; and based on determining the second updated risk score, transmit a third one or more messages that collectively (i) cause the computing system associated with the gaming platform to resuspend user wagering activity via the gaming platform and (ii) cause the user device to display a second notification that wagering activity has been suspended.

5. The computing device of claim 1, further comprising program instructions stored on the non-transitory computer-readable medium that are executable by the at least one processor such that the computing device is configured to:

transmit a second one or more messages that collectively cause the user device to display an indication of the initial risk score, and wherein the first one or more messages further cause the user device to display (c) an indication of the updated risk score.

6. The computing device of claim 1, wherein the request for user-input data to resume wagering activity comprises a request for verified financial data corresponding to the user, and wherein the verified financial data comprises data related to one or more debt accounts of the user.

7. The computing device of claim 6, wherein the wagering activity data comprises one or more components, and wherein the program instructions that are executable by the at least one processor such that the computing device is configured to determine the updated risk score comprise program instructions that are executable by the at least one processor such that the computing device is configured to assign a respective weight to each of the one or more components of the wagering activity data, the computing device further comprises program instructions stored on the non-transitory computer-readable medium that are executable by the at least one processor such that the computing device is configured to:

receive, from the user device, the verified financial data corresponding to the user;

identify, in the verified financial data corresponding to the user, a negative financial outcome for the user;

determine a predictiveness of the one or more components of the wagering activity data in relation to the identified negative financial outcome; and based on the predictiveness of the one or more components of the wagering activity data in relation to the identified negative financial outcome, update the respective weights to be assigned to each component when the risk score is updated.

8. The computing device of claim 1, wherein the request for user-input data comprises a request for an identification of one or more recipients, other than the user, for a gaming rebate assigned to the user, the computing device further comprising program instructions stored on the non-transitory computer-readable medium that are executable by the at least one processor such that the computing device is configured to:

receive, from the user device, a user input indicating the one or more recipients, other than the user.

9. The computing device of claim 1, wherein the one or more messages further collectively cause the computing device associated with the gaming platform to update a gaming platform account of the user.

10. The computing device of claim 1, wherein the program instructions that are executable by the at least one processor such that the computing device is configured to transmit the one or more messages comprise program instructions that are executable by the at least one processor such that the computing device is configured to:

transmit, to the computing system associated with the gaming platform, a first one or more messages that collectively cause the computing system associated with the gaming platform to temporarily suspend wagering activity by the user via the gaming platform; and transmit, to the user device associated with the user, a second one or more messages that collectively cause the user device associated with the user to display (a) the notification that wagering activity has been temporarily suspended and (b) the request for user-input data to resume wagering activity.

11. The computing device of claim 1, wherein the program instructions that are executable by the at least one processor such that the computing device is configured to transmit the one or more messages comprise program instructions that are executable by the at least one processor such that the computing device is configured to:

transmit, to the computing system associated with the gaming platform, a first one or more messages that collectively cause the computing system associated with the gaming platform to (i) temporarily suspend wagering activity by the user via the gaming platform and (ii) transmit, to the user device associated with the user, a second one more messages that collectively cause the user device associated with the user to display (a) the notification that wagering activity has been temporarily suspended and (b) the request for user-input data to resume wagering activity.

12. A non-transitory computer-readable medium, wherein the non-transitory computer-readable medium is provisioned with program instructions that, when executed by at least one processor, cause a computing device to:

obtain financial data corresponding to a user;

based on at least the obtained financial data corresponding to the user, determine an initial risk score for the user that represents an estimate of financial risk of the user;

receive, from a computing system associated with a gaming platform, wagering activity data corresponding to wagers placed by the user via the gaming platform;

based on at least the received wagering activity data, determine an updated risk score for the user that indicates an increased estimate of financial risk; and based on determining the updated risk score, transmit one or more messages that collectively (i) cause the computing system associated with the gaming platform to temporarily suspend wagering activity by the user via the gaming platform and (ii) cause a user device associated with the user to display (a) a notification that wagering activity has been temporarily suspended and (b) a request for user-input data to resume wagering activity.

13. The non-transitory computer-readable medium of claim 12, wherein the computing system associated with the gaming platform is a first computing system associated with a first gaming platform, and wherein the non-transitory computer-readable medium is also provisioned with program instructions that, when executed by at least one processor, cause the computing device to:

based on determining the updated risk score, transmit a second one or more messages to a second computing system associated with a second gaming platform, wherein the second one or more messages collectively cause the second computing system associated with the second gaming platform to temporarily suspend user wagering activity by the user via the second gaming platform.

14. The non-transitory computer-readable medium of claim 12, wherein the non-transitory computer-readable medium is also provisioned with program instructions that, when executed by at least one processor, cause the computing device to:

receive, from the user device, the requested user-input data; and based on receiving the requested user-input data, transmit a second one or more messages to the computing system associated with the gaming platform, wherein the second one or more messages collectively cause the computing system associated with the gaming platform to unsuspend user wagering activity by the user via the gaming platform.

15. The non-transitory computer-readable medium of claim 12, wherein the non-transitory computer-readable medium is also provisioned with program instructions that, when executed by at least one processor, cause the computing device to:

transmit a second one or more messages that collectively cause the user device to display an indication of the initial risk score, and wherein the first one or more messages further cause the user device to display (c) an indication of the updated risk score.

16. The non-transitory computer-readable medium of claim 12, wherein the request for user-input data to resume wagering activity comprises a request for verified financial data corresponding to the user, and wherein the verified financial data comprises data related to one or more debt accounts of the user.

17. The non-transitory computer-readable medium of claim 16, wherein the wagering activity data comprises one or more components, wherein the program instructions that, when executed by at least one processor, cause the computing device to determine the updated risk score comprise program instructions that, when executed by at least one processor, cause the computing device to assign a respective weight to each of the one or more components of the wagering activity data, and wherein the non-transitory computer-readable medium is also provisioned with program instructions that, when executed by at least one processor, cause the computing device to:

receive, from the user device, the verified financial data corresponding to the user;

identify, in the verified financial data corresponding to the user, a negative financial outcome for the user;

determine a predictiveness of the one or more components of the wagering activity data in relation to the identified negative financial outcome; and based on the predictiveness of the one or more components of the wagering activity data in relation to the identified negative financial outcome, update the respective weights to be assigned to each component when the risk score is updated.

18. The non-transitory computer-readable medium of claim 12, wherein the program instructions that, when executed by at least one processor, cause the computing device to transmit the one or more messages comprise program instructions that, when executed by at least one processor, cause the computing device to:

transmit, to the computing system associated with the gaming platform, a first one or more messages that collectively cause the computing system associated with the gaming platform to (i) temporarily suspend wagering activity by the user via the gaming platform and (ii) transmit, to the user device associated with the user, a second one more messages that collectively cause the user device associated with the user to display (a) the notification that wagering activity has been temporarily suspended and (b) the request for user-input data to resume wagering activity.

19. The non-transitory computer-readable medium of claim 12, wherein the program instructions that, when executed by at least one processor, cause the computing device to transmit the one or more messages comprise program instructions that, when executed by at least one processor, cause the computing device to:

transmit, to the computing system associated with the gaming platform, a first one or more messages that collectively cause the computing system associated with the gaming platform to temporarily suspend wagering activity by the user via the gaming platform; and transmit, to the user device associated with the user, a second one or more messages that collectively cause the user device associated with the user to display (a) the notification that wagering activity has been temporarily suspended and (b) the request for user-input data to resume wagering activity.

20. A method carried out by a computing device, the method comprising:

obtaining financial data corresponding to a user;

based on at least the obtained financial data corresponding to the user, determining an initial risk score for the user that represents an estimate of financial risk of the user;

receiving, from a computing system associated with a gaming platform, wagering activity data corresponding to wagers placed by the user via the gaming platform;

based on at least the received wagering activity data, determining an updated risk score for the user that indicates an increased estimate of financial risk; and based on determining the updated risk score, transmitting one or more messages that collectively (i) cause the computing system associated with the gaming platform to temporarily suspend wagering activity by the user via the gaming platform and (ii) cause a user device associated with the user to display (a) a notification that wagering activity has been temporarily suspended and (b) a request for user-input data to resume wagering activity.

* * * * *